(12) United States Patent
Okada et al.

(10) Patent No.: US 12,158,608 B2
(45) Date of Patent: Dec. 3, 2024

(54) CUTTING JIG AND CUTTING METHOD OF OPTICAL FIBER

(71) Applicant: NITTO DENKO CORPORATION, Osaka (JP)

(72) Inventors: Kazumasa Okada, Osaka (JP); Keita Kiyoshima, Osaka (JP); Yuichi Tsujita, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 259 days.

(21) Appl. No.: 17/613,349

(22) PCT Filed: May 21, 2020

(86) PCT No.: PCT/JP2020/020198
§ 371 (c)(1),
(2) Date: Nov. 22, 2021

(87) PCT Pub. No.: WO2020/241464
PCT Pub. Date: Dec. 3, 2020

(65) Prior Publication Data
US 2022/0221651 A1 Jul. 14, 2022

(30) Foreign Application Priority Data

May 24, 2019 (JP) .................................. 2019-097855
May 21, 2020 (JP) .................................. 2020-089150

(51) Int. Cl.
*G02B 6/25* (2006.01)
*B26B 1/08* (2006.01)
*B26B 29/06* (2006.01)

(52) U.S. Cl.
CPC ................. *G02B 6/25* (2013.01); *B26B 1/08* (2013.01); *B26B 29/06* (2013.01)

(58) Field of Classification Search
CPC .. G02B 6/25; B26B 1/08; B26B 29/06; Y10T 225/321; Y10T 225/325; Y10T 225/0333;
(Continued)

(56) References Cited

U.S. PATENT DOCUMENTS 4,582,392 A * 4/1986 Williams ............. G02B 6/3897
83/167
4,842,361 A * 6/1989 Schrauder ................ G02B 6/25
83/167
(Continued)

FOREIGN PATENT DOCUMENTS

CN 102958654 A 3/2013
CN 205899098 U 1/2017
(Continued)

OTHER PUBLICATIONS

International Preliminary Report on Patentability issued by WIPO on Nov. 16, 2021, in connection with International Patent Application No. PCT/JP2020/020198.
(Continued)

*Primary Examiner* — Evan H MacFarlane
(74) *Attorney, Agent, or Firm* — Edwards Neils LLC; Jean C. Edwards, Esq.

(57) ABSTRACT

A cutting jig includes a fixing member for inserting a distal end portion of an optical fiber, and an inclination cutting unit movable with respect to the fixing member for cutting the distal end portion. The distal end portion is defined into a proximal end portion and a free end portion. The inclination cutting unit includes a one end edge of a closing plate and a blade portion incapable of relative movement to each other. The inclination cutting unit can perform a first movement and a second movement that is a greater movement amount than the first movement. The one end edge is brought into contact with the free end portion based on the first movement, and the free end portion moves to be
(Continued)

inclined with respect to an extension line EL. A blade edge is brought into contact with the free end portion based on the second movement.

8 Claims, 12 Drawing Sheets

(58) Field of Classification Search
CPC ............... Y10T 225/371; Y10T 225/12; Y10T 225/314; C03B 33/06; C03B 33/10; C03B 33/105; C03B 33/12; C03B 33/14
See application file for complete search history.

(56) References Cited

U.S. PATENT DOCUMENTS

| | | | |
|---|---|---|---|
| 6,510,271 | B1 | 1/2003 | Beldycki |
| 2004/0099121 | A1 | 5/2004 | Itano et al. |
| 2004/0228596 | A1* | 11/2004 | Tabeling ................. G02B 6/25 385/134 |
| 2008/0132991 | A1 | 6/2008 | Pinchuk et al. |
| 2011/0126414 | A1 | 6/2011 | Mulligan et al. |
| 2013/0125718 | A1 | 5/2013 | Kurosaka et al. |

FOREIGN PATENT DOCUMENTS

| | | |
|---|---|---|
| JP | 59-000119 A | 1/1984 |
| JP | S62-027706 A | 2/1987 |
| JP | 2004-117794 A | 4/2004 |
| JP | 2005-300597 A | 10/2005 |
| JP | 2010-511439 A | 4/2010 |
| JP | 2010-286795 A | 12/2010 |
| JP | 2011-075743 A | 4/2011 |
| JP | 2013-068668 A | 4/2013 |
| JP | 2013-257366 A | 12/2013 |
| JP | 2014-071174 A | 4/2014 |
| JP | 2016-009041 A | 1/2016 |
| JP | 6136742 B2 | 5/2017 |
| WO | 96/33430 A1 | 10/1996 |

OTHER PUBLICATIONS

International Search Report Issued in PCT/JP2020/020198 on Aug. 11, 2020.
Written Opinion Issued in PCT/JP2020/020198 on Aug. 11, 2020.
Extended European Search Report issued on Jun. 19, 2023, in connection with European Patent Application No. 20813329.8.
Office Action, issued by the China National Intellectual Property Administration on Aug. 24, 2023, in connection with Chinese Patent Application No. 202080035976.6.
Office Action, issued by the Japanese Patent Office on Mar. 12, 2024, in connection with Japanese Patent Application No. 2020-089150.
Office Action, issued by the Taiwanese Patent Office on Apr. 9, 2024, in connection with Taiwanese Patent Application No. 109117147.
Office Action, issued by the China National Intellectual Property Administration on Apr. 20, 2024, in connection with Chinese Patent Application No. 202080035976.6.

* cited by examiner

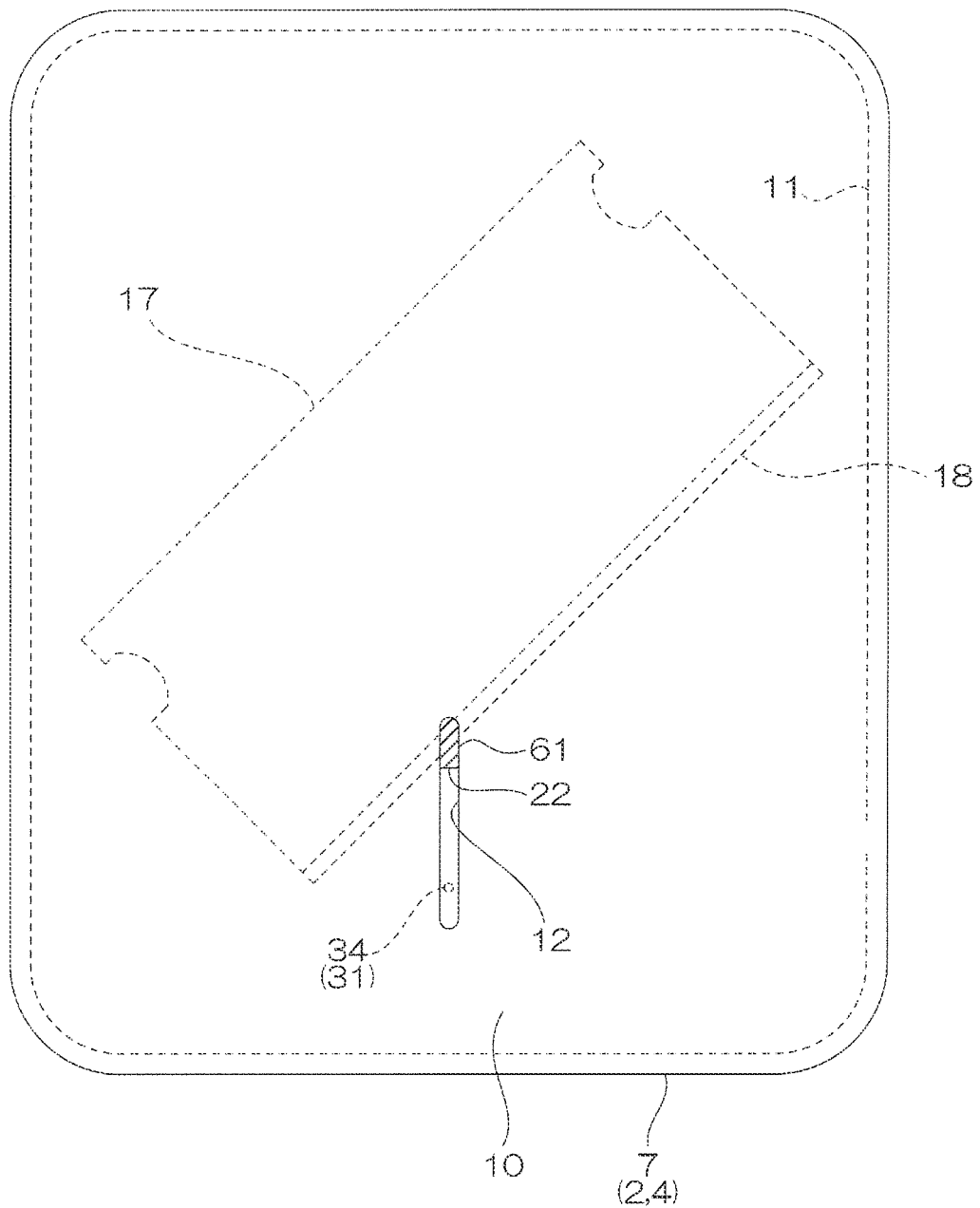

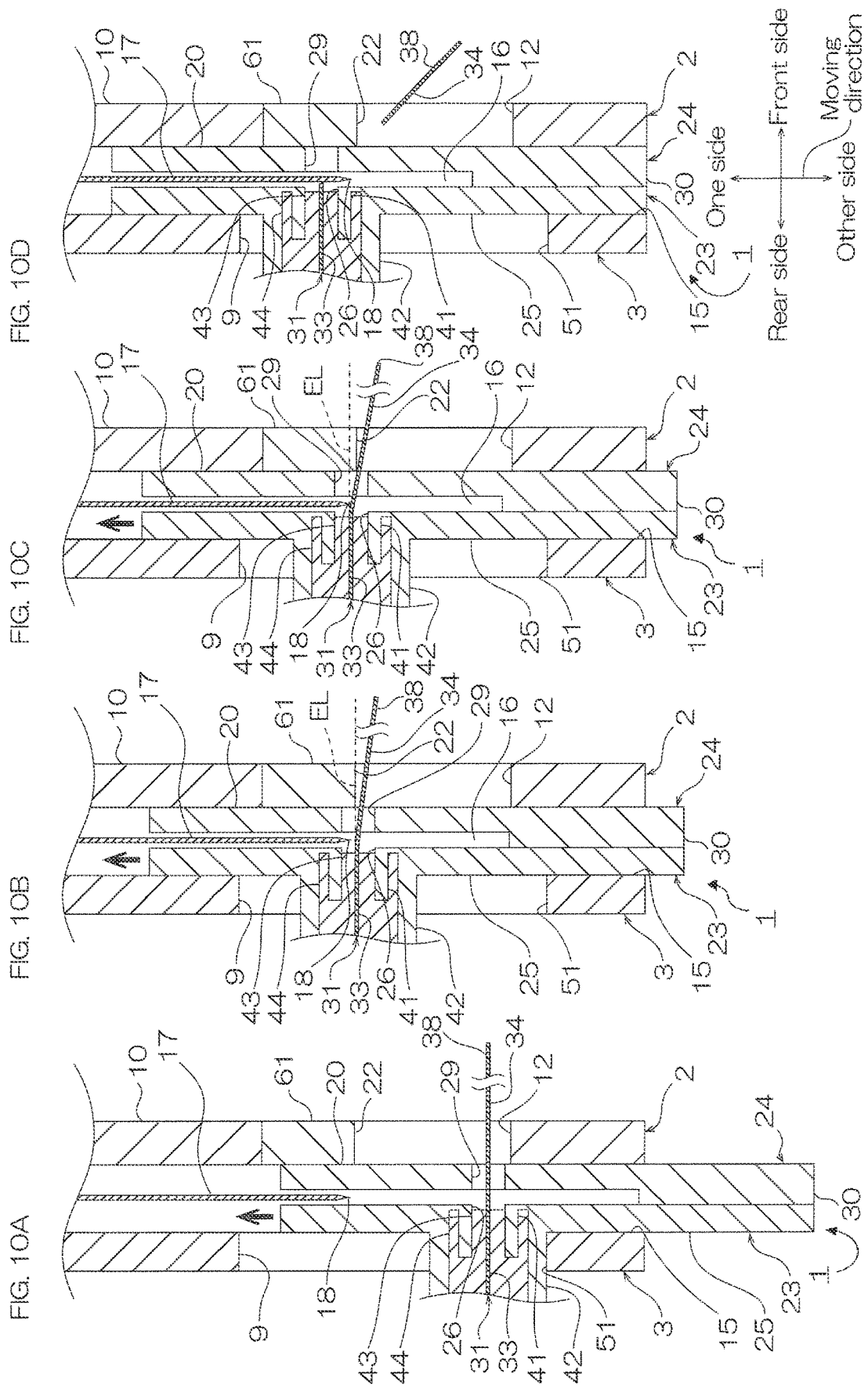

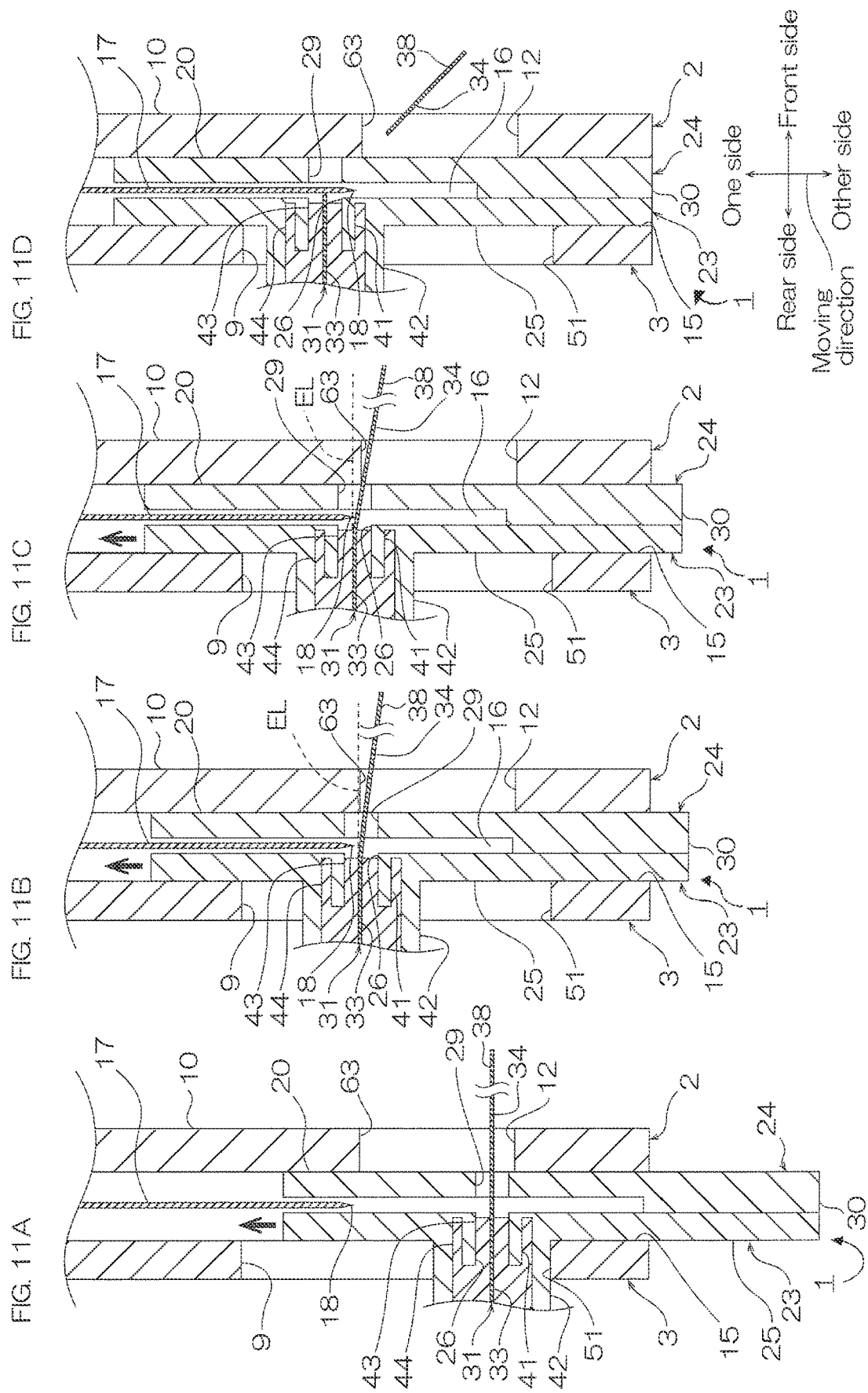

CUTTING JIG AND CUTTING METHOD OF OPTICAL FIBER

CROSS-REFERENCE TO RELATED APPLICATIONS

The present application is a 35 U.S.C. 371 National Stage Entry of PCT/JP2020/020198, filed on May 21, 2020, which claims priority from Japanese Patent Application Nos. 2019-097855, filed on May 24, 2019, and 2020-089150, filed on May 21, 2020, the contents of all of which are herein incorporated by reference in their entirety.

TECHNICAL FIELD

The present invention relates to a cutting jig and a method for cutting an optical fiber, specifically, a cutting jig and a method for cutting an optical fiber using the cutting jig.

BACKGROUND ART

Conventionally, it has been known that a distal end portion of an optical fiber is cut so that its cut surface (end surface) is vertical in a transmission direction, and the end surface is connected to another optical member.

Recently, as a cutting method for the distal end portion of the optical fiber, a method for obliquely cutting the distal end portion has been proposed (ref: for example, Patent Document 1). According to this method, light is reflected on the end surface, and it is possible to prevent the reflected light due to this from returning to an optical device connected to a rear end portion.

In Patent Document 1, after fixing two different locations in an axial direction of the optical fiber with a holding tool, the optical fiber is deformed upwardly by pressing a pushing tool to the lower surface of the optical fiber between the two fixed points, and then, a blade edge of a blade is applied to the upper surface of the optical fiber from a vertical direction to cut the optical fiber.

CITATION LIST

Patent Document

Patent Document 1: Japanese Unexamined Patent Publication No. 2005-300597

SUMMARY OF THE INVENTION

Problem to be Solved by the Invention

However, in the device described in Patent Document 1, the movement of the pushing tool to the optical fiber, and the movement of the blade to the optical fiber are separately carried out. Therefore, each driving device for driving the pushing tool and the blade is required. As a result, there is a problem that a device configuration, and the control become complicated.

Further, when a movement amount (pushing amount) of the pushing tool cannot be accurately controlled for each operation, there is a problem that an angle formed between the deformed optical fiber and a moving direction of the blade tends to be easily different for each operation, and therefore, the formation accuracy of the end surface is lowered.

The present invention provides a cutting jig capable of simplifying a device configuration, easily cutting a free end portion so as to be inclined with respect to a perpendicular direction of a proximal end portion, and furthermore, improving the formation accuracy of a cut surface of an optical fiber, and a method for cutting an optical fiber.

Means for Solving the Problem

The present invention (1) includes a cutting jig including a fixing member for inserting a distal end portion of an optical fiber, and a cutting unit movable with respect to the fixing member for cutting the distal end portion, wherein the distal end portion is configured to be defined into a proximal end portion fixed to the fixing member, and a free end portion located at the front side with respect to the proximal end portion and not fixed to the fixing member; the cutting unit includes an inclination imparting portion and a blade portion incapable of relative movement to each other; the cutting unit is capable of carrying out a first movement of moving with respect to the fixing member, and following the first movement, a second movement of moving with respect to the fixing member with a larger movement amount than the first movement; the inclination imparting portion is configured so that the inclination imparting portion is brought into contact with the free end portion based on the first movement of the cutting unit, and the free end portion moves to be inclined with respect to an extension line of the proximal end portion extending along a transmission direction of light; and the blade portion is configured so that a blade edge of the blade portion is brought into contact with the free end portion based on the second movement of the cutting unit.

In this cutting jig, the distal end portion of the optical fiber is inserted into the fixing member to be fixed, and the inclination imparting portion is brought into contact with the free end portion based on the first movement of the cutting unit with respect to the fixing member to incline the free end portion, and following the first movement, the blade edge is brought into contact with the free end portion based on the second movement of the cutting unit with respect to the fixing member to cut the free end portion. Therefore, it is possible to form the cut surface along a direction along the moving direction of the second movement, that is, a direction inclining toward the moving direction of the fixing member in the free end portion in the free end portion of the optical fiber.

Further, since the cutting jig includes the cutting unit including the inclination imparting portion and the blade portion incapable of relative movement to each other, the configuration is simple as compared with the device of Patent Document 1 including a pushing tool and the blade portion each of which moves independently.

Furthermore, since the inclination imparting portion and the blade portion incapable of relative movement to each other are moved with respect to the fixing member, it is possible to easily cut the free end portion with the blade edge as compared with a case including the inclination imparting portion and the blade portion capable of relative movement to each other.

Moreover, since the inclination imparting portion and the blade portion are incapable of relative movement to each other, it is possible to make an inclined state of the free end portion uniform at the time of a contact of the blade edge with the free end portion. Therefore, it is possible to improve the formation accuracy of the cut surface of the optical fiber.

The present invention (2) includes the cutting jig described in (1), wherein the cutting unit further includes a holding member for holding the blade portion, and the fixing member is movably attached to the holding member.

In the cutting jig, since the holding member holds the blade portion in the cutting unit, it is possible to reliably move the blade portion with respect to the fixing member by the holding member.

The present invention (3) includes the cutting jig described in (2), wherein the inclination imparting portion is attached to the holding member.

In the cutting jig, since the inclination imparting portion is attached to the holding member, the configuration is simple.

The present invention (4) includes the cutting jig described in (3), wherein the holding member has a slit capable of guiding the free end portion along with the first movement and the second movement.

In the cutting jig, since the free end portion can be guided by the slit in the first movement and the second movement, it is possible to smoothly incline and cut the free end portion.

The present invention (5) includes the cutting jig described in (4) further including a closing member for closing a portion of an open end edge of the slit, wherein an end portion of the closing member is the inclination imparting portion.

In the cutting jig, it is possible to easily configure the inclination imparting portion by the closing member.

The present invention (6) includes the cutting jig described in (4) further including a filling member for filling a portion of the slit, wherein an end portion of the filling member is the inclination imparting portion.

In the cutting jig, it is possible to easily configure the inclination imparting portion by the filling member.

The present invention (7) includes the cutting jig described in (4), wherein an inner end edge defining one end edge in an extending direction of the slit in the holding member is the inclination imparting portion.

In the jig, since the holding member does not need to include the closing member of (5) or the filling member of (6) described above, it is possible to easily configure the inclination imparting portion by the inner end edge of the holding member, while reducing the number of components.

The present invention (8) includes the cutting jig described in any one of (1) to (7), wherein the blade edge is inclined with respect to a direction perpendicular to a transmission direction of light in the free end portion, and a moving direction of the blade portion.

In the cutting jig, since the blade edge is inclined with respect to the perpendicular direction, it is possible to cut the optical fiber with a small pressure as compared with a case of being along the perpendicular direction.

The present invention (9) includes the cutting jig described in any one of (1) to (8), wherein an anchor member anchored to the periphery of the proximal end portion is fitted into the fixing member.

In the cutting jig, since the anchor member anchored to the periphery of the proximal end portion is fitted into the fixing member, it is possible to cut the free end portion, while reliably fixing the proximal end portion to the fixing member. Therefore, it is possible to further ensure the formation accuracy of the cut surface of the optical fiber.

The present invention (10) includes a method for cutting an optical fiber using the cutting jig described in any one of (1) to (9) including a first step of inserting a distal end portion into a fixing member to fix a proximal end portion to the fixing member, a second step of moving a cutting unit with respect to the fixing member, and bringing an inclination imparting portion into contact with a free end portion to incline the free end portion, and a third step of further moving the cutting unit with respect to the fixing member, and bringing a blade edge of a blade portion into contact with the free end portion to cut the free end portion.

In the method for cutting an optical fiber, since the inclination imparting portion and the blade portion are moved together with respect to the fixing member, it is possible to easily carry out the inclination and the cutting of the free end portion. Therefore, it is possible to easily and accurately form the inclined cut surface.

Effect of the Invention

The cutting jig of the present invention has a simple configuration, and it is possible to easily cut a free end portion by a blade edge.

BRIEF DESCRIPTION OF THE DRAWINGS

FIG. 6A illustrating a preparation step of preparing the cutting jig and an optical connector, FIG. 6B illustrating a second step of inclining a free end portion, FIG. 6C illustrating a third step of cutting the free end portion, and FIG. 6D illustrating a step of housing a fixing unit in a case.

FIG. 9 shows a modified example of the cutting jig shown in FIG. 7, and a one side view of the front wall and a filling portion.

FIGS. 10A to 10D show process views of a modified example of a method for cutting an optical fiber using the cutting jig shown in FIG. 9:

FIG. 10A illustrating a preparation step of preparing the cutting jig and an optical connector, FIG. 10B illustrating a second step of inclining a free end portion, FIG. 10C illustrating a third step of cutting the free end portion, and FIG. 10D illustrating a step of housing a fixing unit in a case.

FIGS. 11A to 11D show process views of a modified example of a method for cutting an optical fiber using the cutting jig shown in FIGS. 6A to 6D:

FIG. 11A illustrating a preparation step of preparing the cutting jig and an optical connector, FIG. 11B illustrating a second step of inclining a free end portion, FIG. 11C illustrating a third step of cutting the free end portion, and FIG. 11D illustrating a step of housing a fixing unit in a case.

FIG. 12A illustrating a step of allowing two cut surfaces to face each other and FIG. 12B illustrating a step of brining two cut surfaces into contact with each other.

DESCRIPTION OF EMBODIMENTS

One embodiment of a cutting jig and a method for cutting an optical fiber of the present invention is described with reference to FIGS. 1 to 8.

Figure 5:
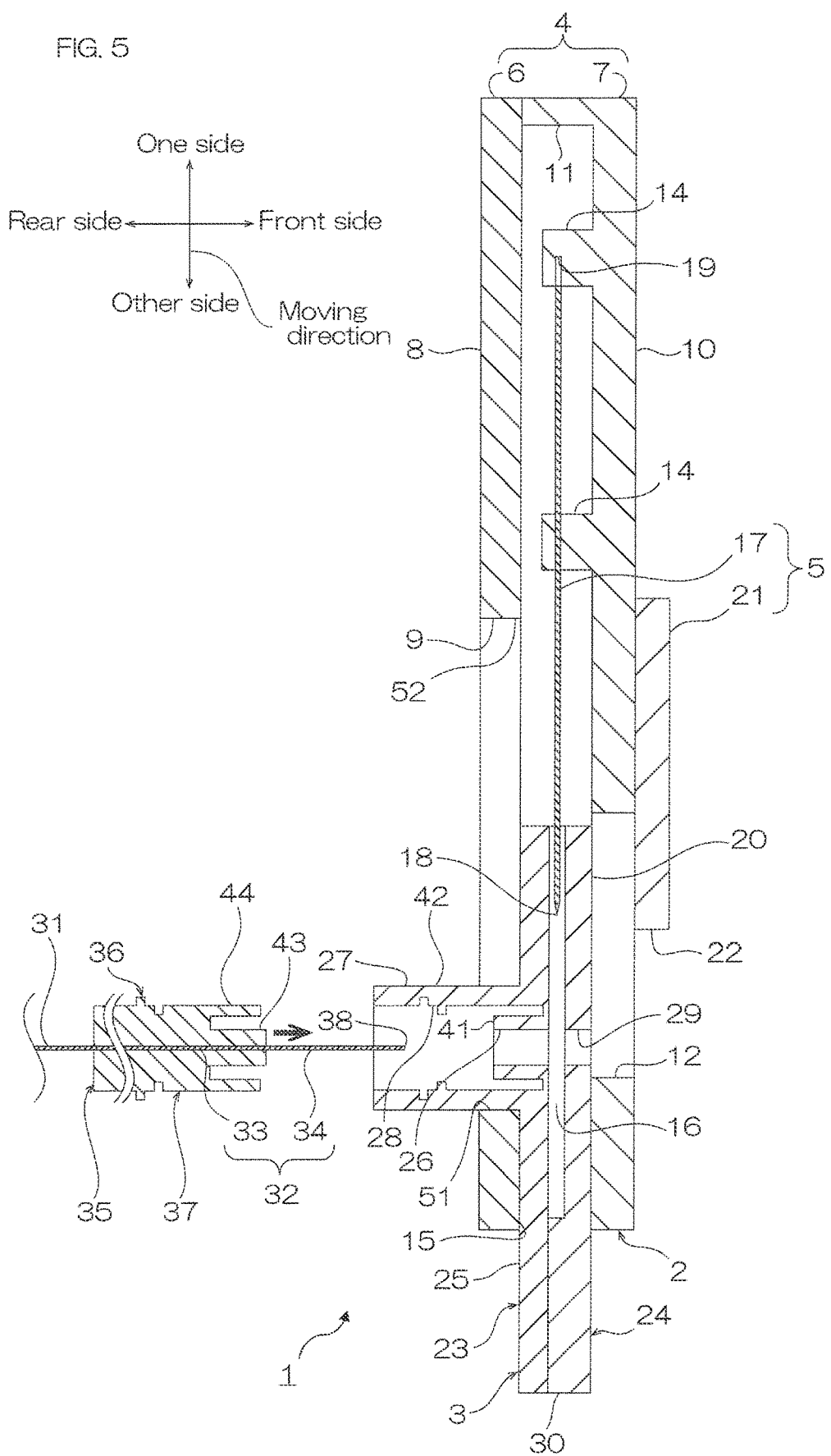
FIG. 5 shows a side cross-sectional view of the cutting jig shown in FIG. 1.
Figure 6:
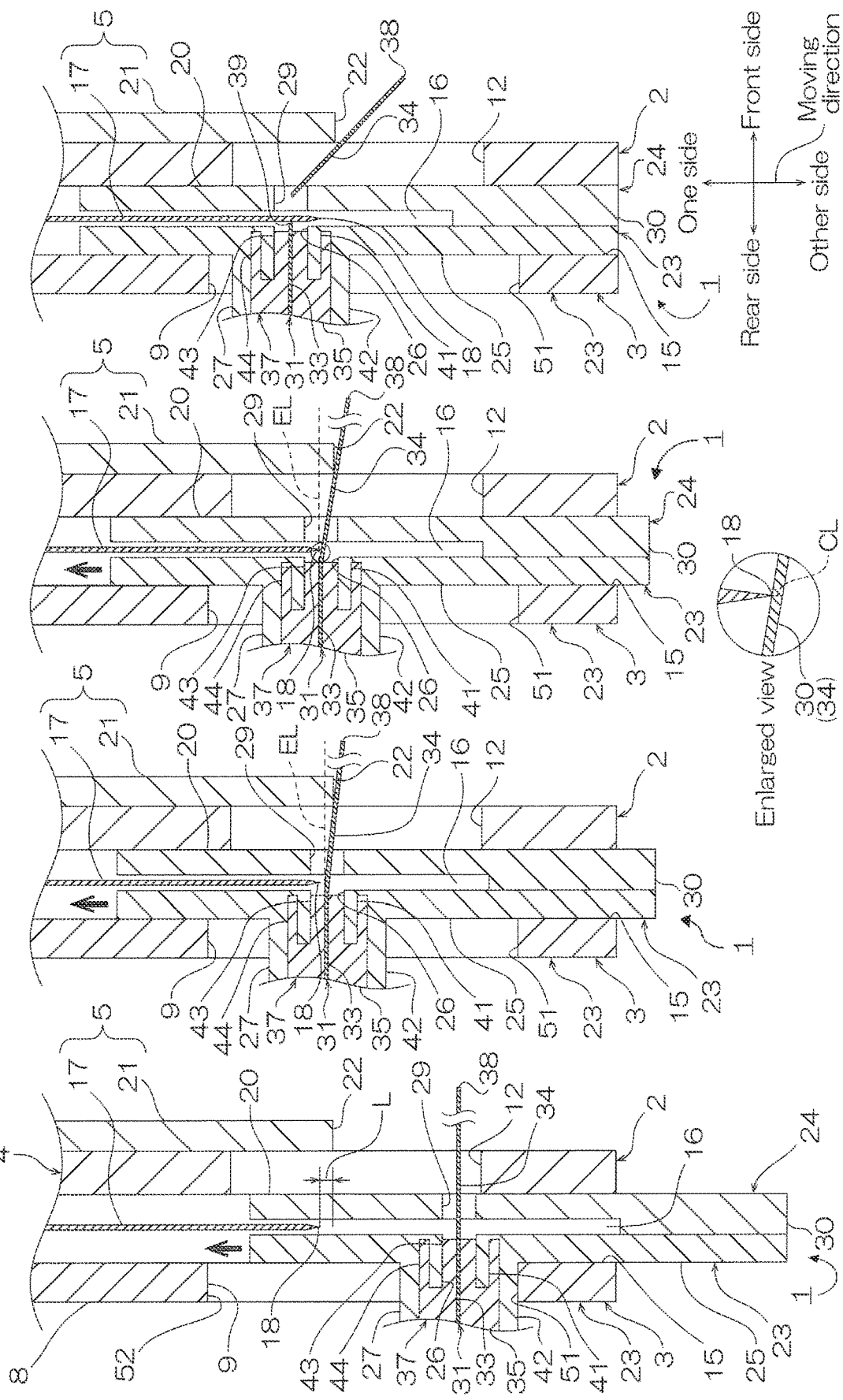
FIGS. 6A to 6D show process views for illustrating a method for cutting an optical fiber using the cutting jig shown in FIG. 5.
Figure 7:
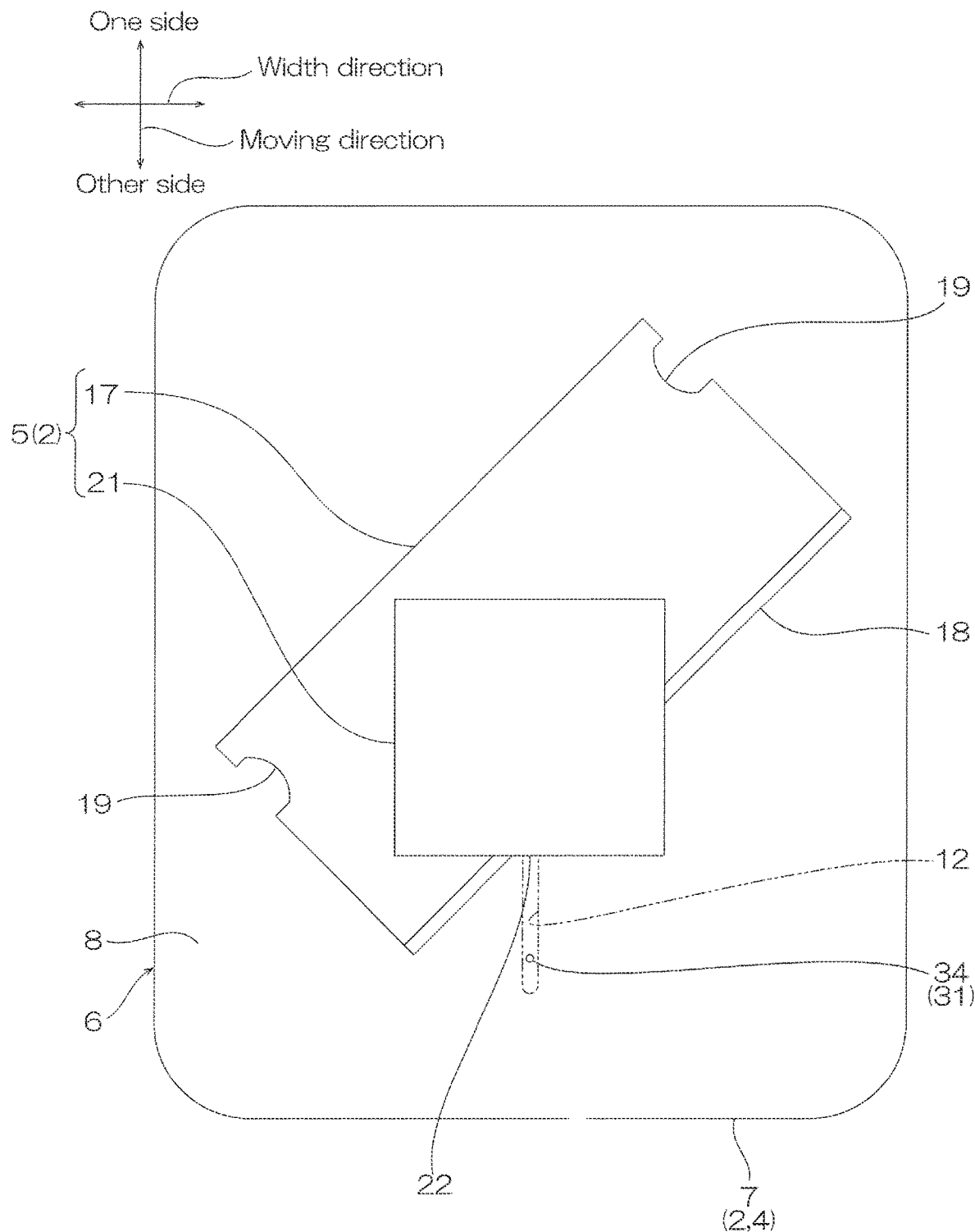
FIG. 7 shows a one side view (view of seeing through a front wall) of a closing plate, the front wall, and a blade portion of the cutting jig shown in FIG. 2.

In FIG. 5, a right-left direction on the plane of the sheet is a front-rear direction (first direction), a right side on the plane of the sheet is a front side, and a left side on the plane of the sheet is a rear side. An up-down direction on the plane of the sheet is a moving direction (second direction perpendicular to the front-rear direction) with respect to a holding cutting unit 2 (described later) of a fixing unit 3 (described later), a lower side on the plane of the sheet is an other side in the moving direction, and an upper side on the plane of the sheet is one side in the moving direction. In FIG. 7, the right-left direction on the plane of the sheet is a width direction (third direction perpendicular to the front-rear direction and the moving direction). Each direction conforms to a direction described in each view.

Figure 1:
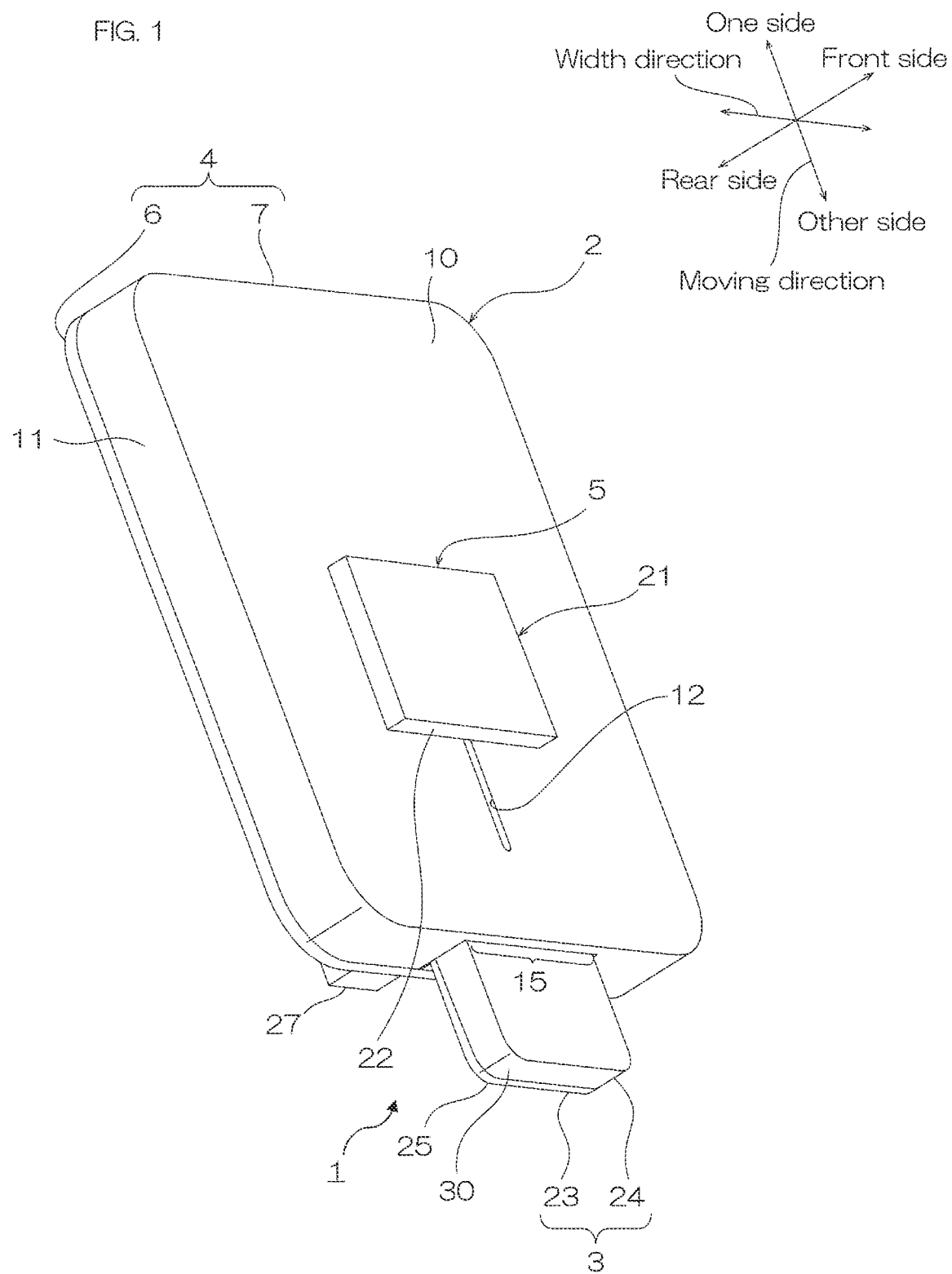
FIG. 1 shows a perspective view of a cutting jig of one embodiment of a cutting jig of the present invention when viewed from a rear side.

As shown in FIGS. 1 and 5, a cutting jig 1 includes the holding cutting unit 2 and the fixing unit 3. Further, the cutting jig 1 includes the holding cutting unit 2 and the fixing unit 3 movably to each other, and in this embodiment, the fixing unit 3 is movable with respect to the holding cutting unit 2.

That is, in the cutting jig 1 of this embodiment, an embodiment in which the fixing unit 3 is used so as to move with respect to the holding cutting unit 2 is described. In this embodiment, as shown in FIGS. 6A to 6D, when an optical fiber 31 is cut using the cutting jig 1, the fixing unit 3 moves from the other side (lower side on the plane of the sheet) toward one side (upper side on the plane of the sheet). FIGS. 5 and 6A show the cutting jig 1 before the above-described movement.

The holding cutting unit 2 is a unit for cutting a distal end portion 32 of the optical fiber 31. The holding cutting unit 2 includes a case 4 as one example of a holding member, and an inclination cutting unit 5 as one example of a cutting unit.

As shown in FIG. 1, the case 4 has a generally box shape which is thin in the front-rear direction. The case 4 has a generally rectangle shape when viewed from the front. As shown in FIG. 5, the case 4 includes a front case member 7 and a rear case member 6.

Figure 2:
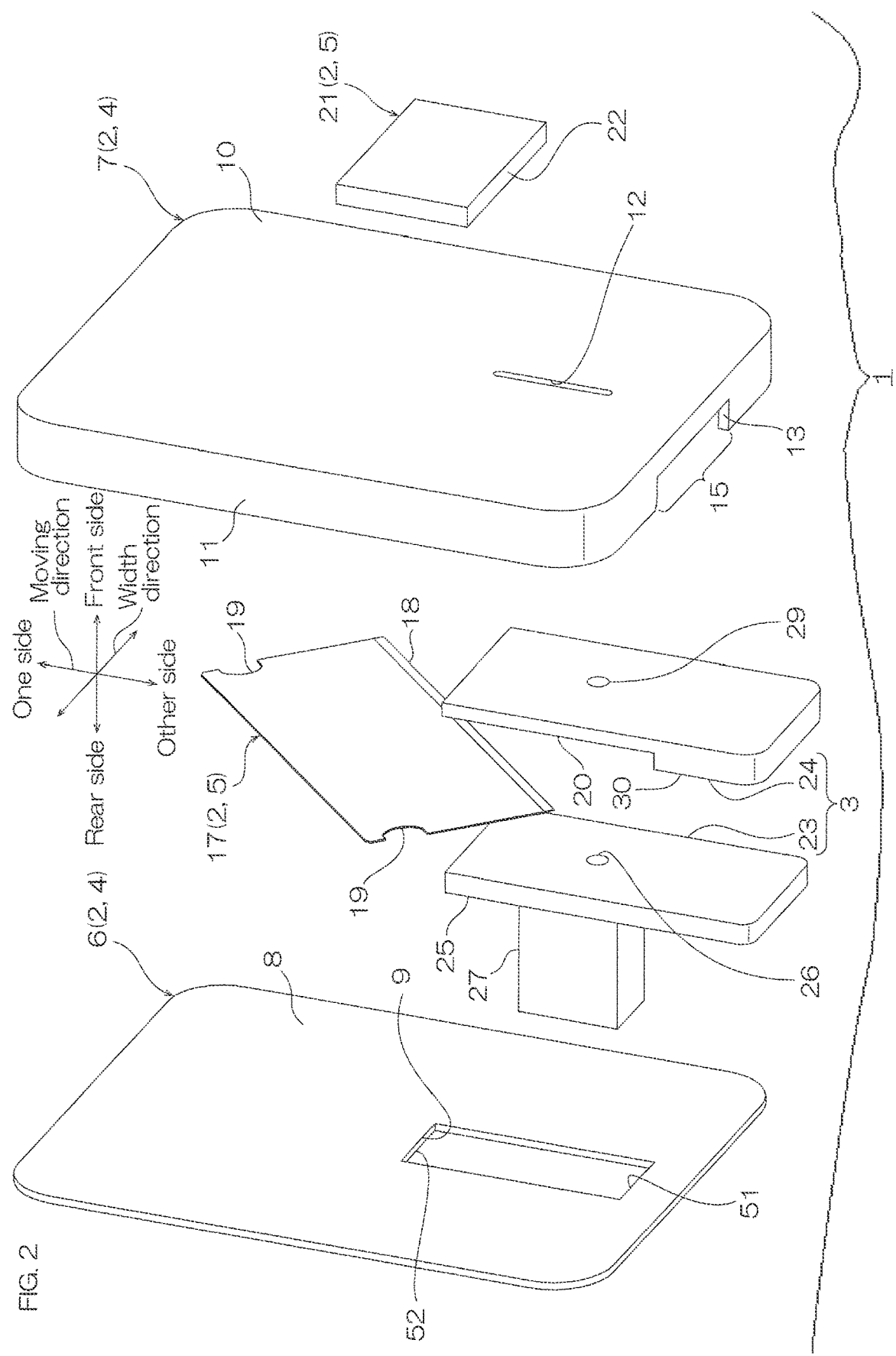
FIG. 2 shows a disassembled perspective view of the cutting jig shown in FIG. 1.
Figure 3:
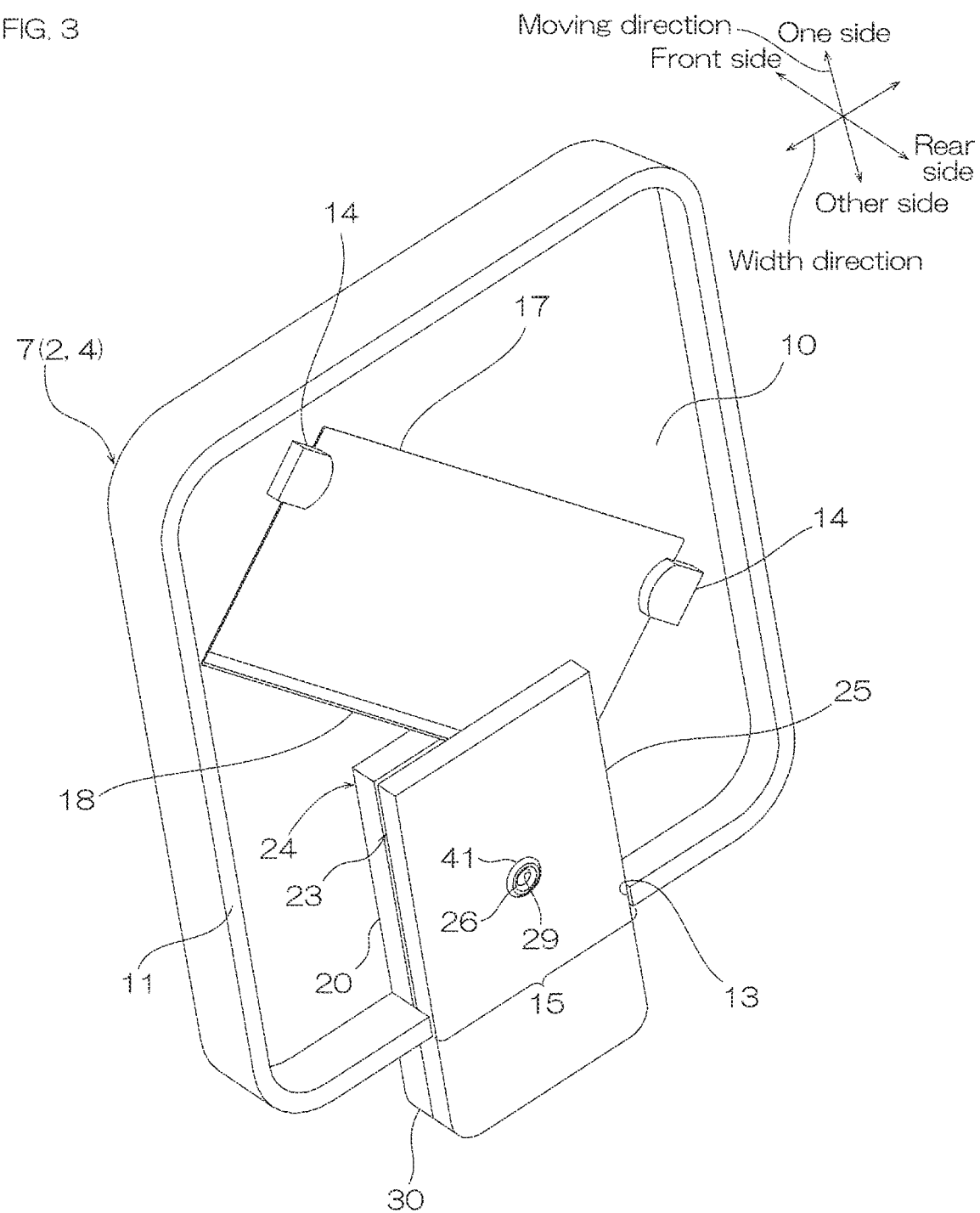
FIG. 3 shows the cutting jig shown in FIG. 1, and a perspective view in which a rear wall is omitted.

As shown in FIGS. 2 and 3, the front case member 7 includes a front wall 10, a peripheral wall 11, and a locking portion 14.

Figure 4:
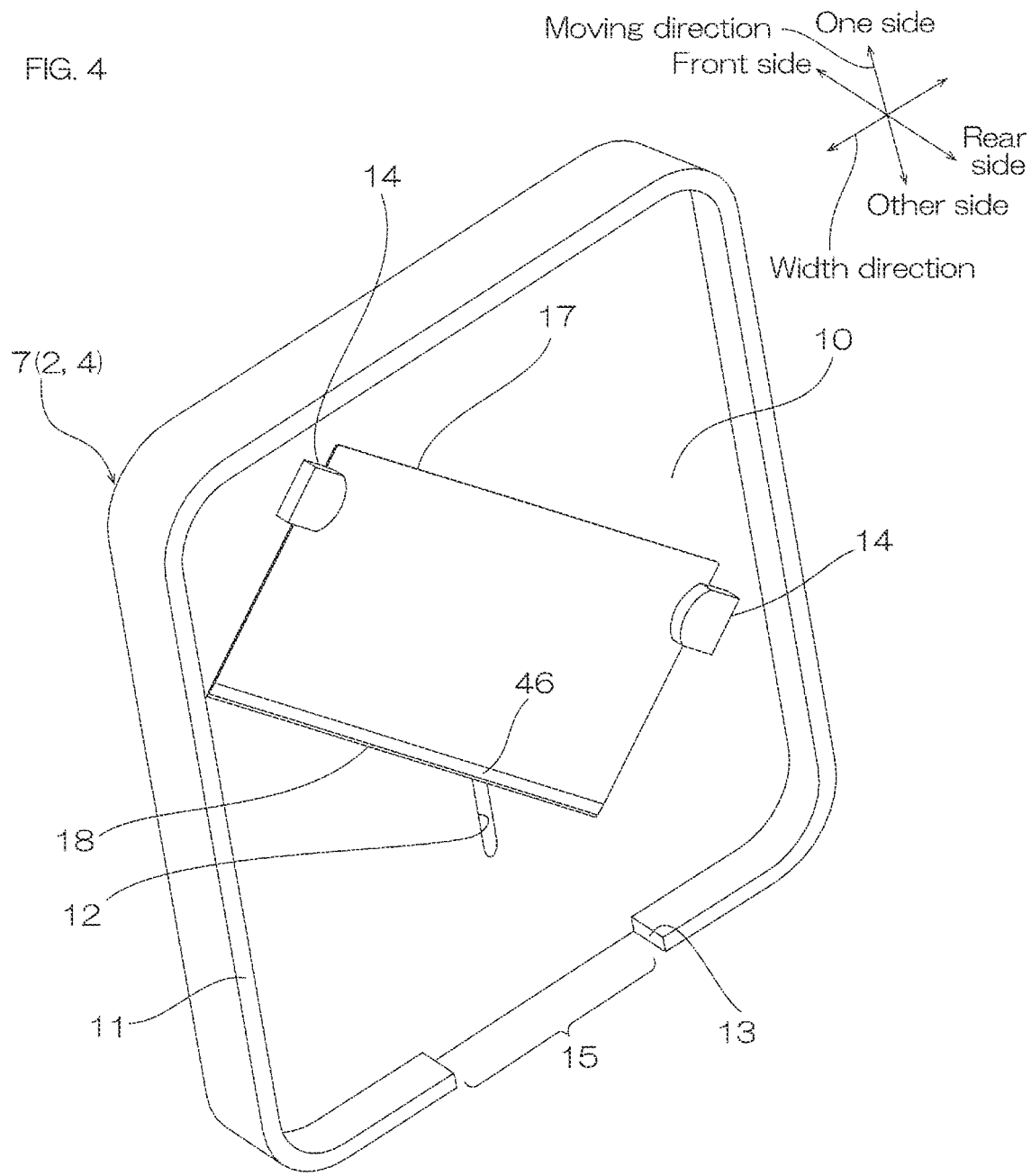
FIG. 4 shows the cutting jig shown in FIG. 3, and a perspective view in which a rear wall and a fixing unit are omitted.

As shown in FIGS. 2 and 4, the front wall 10 has a plate shape. The front wall 10 has a slit 12.

The slit 12 penetrates the front wall 10 in the front-rear direction. The slit 12 extends along the moving direction. A width of the slit 12 is set to allow the movement of the distal end portion 32 of the optical fiber 31 in the slit 12, and specifically, is longer than the maximum length (specifically, the outer diameter) in a cross-sectional view of the optical fiber 31.

As shown in FIGS. 3 and 4, the locking portion 14 has a hook shape protruding rearwardly from the rear surface of the front wall 10, and is disposed on the rear surface of the front wall 10. The plurality of (two) locking portions 14 are disposed spaced apart from each other in a plane direction (direction along the rear surface of the front wall 10). As shown in FIG. 4, for example, a phantom line extending from the slit 12 toward one side in the moving direction intersects a line segment connecting the two locking portions 14.

The peripheral wall 11 is a side wall extending rearwardly from the peripheral end portion of the rear surface of the front wall 10. An intermediate portion in the width direction of the other end portion in the moving direction of the peripheral wall 11 is cut out. Thus, an opening portion 15 for opening the intermediate portion in the width direction of the other end portion in the moving direction thereof is defined in the case 4.

As shown in FIGS. 1 and 2, the rear case member 6 is located on the rear side of the front case member 7. As shown in FIG. 2, the rear case member 6 is a rear wall 8 having a generally plate shape which is thin in the front-rear direction. The rear wall 8 has a first hole 9 penetrating the rear wall in the front-rear direction.

The first hole 9 has a generally rectangular shape when viewed from the front. The first hole 9 is an opening having a generally rectangular shape which is long in the moving direction. As shown in FIGS. 2 and 5, a first surface 51 and a second surface 52 for defining the other end portion and one end portion in the moving direction of the first hole 9, respectively, are included in the rear wall 8.

A material for the case 4 is not particularly limited, and examples thereof include resins, ceramics, and metals, and preferably, from the viewpoint of moldability, a resin is used. Examples of the resin include transparent resins such as an acrylic resin, an epoxy resin, and a silicone resin from the viewpoint of easily grasping an insertion state and a cutting state of the optical fiber 31.

As shown in FIGS. 2 and 5, the inclination cutting unit 5 includes a blade portion 17, and a closing plate 21 as one example of a closing member. Preferably, the inclination cutting unit 5 includes only the blade portion 17 and the closing plate 21.

As shown in FIGS. 2 and 3, the blade portion 17 is disposed on the rear side of the front wall 10. The blade portion 17 has a generally rectangular shape when viewed from the front, and has a blade edge 18 located on one long side. The blade edge 18 is inclined with respect to the slit 12 (moving direction). Further, the blade edge 18 is also inclined with respect to the width direction. An angle formed between the blade edge 18 and the slit 12 has a sharp angle of, for example, 20 degrees or more, preferably 30 degrees or more, and for example, 70 degrees or less, preferably 50 degrees or less. The above-described angle is most preferably 45 degrees.

Further, the blade portion 17 has a cut-out portion 19 obtained by cutting out each of the intermediate portions of two short sides facing each other. Each of the two cut-out portions 19 is locked by each of the two locking portions 14. Thus, the blade portion 17 is fixed to the front wall 10 of the case 4. A material for the blade portion 17 is not particularly limited, and examples thereof include metals and ceramics. Preferably, a metal is used.

As shown in FIGS. 1 and 5, the closing plate 21 is disposed on the front surface of the front wall 10. As shown in FIGS. 1 and 7, the closing plate 21 has a plate shape in a generally rectangular shape when viewed from the front. The closing plate 21 has a one end edge 22 facing the opening portion 15 when viewed from the front. The one end edge 22 is one side surface connecting one end portion of the front surface (one surface in the thickness direction) of the closing plate 21 to one end portion of the rear surface (the other surface in the thickness direction) thereof.

Figure 8:
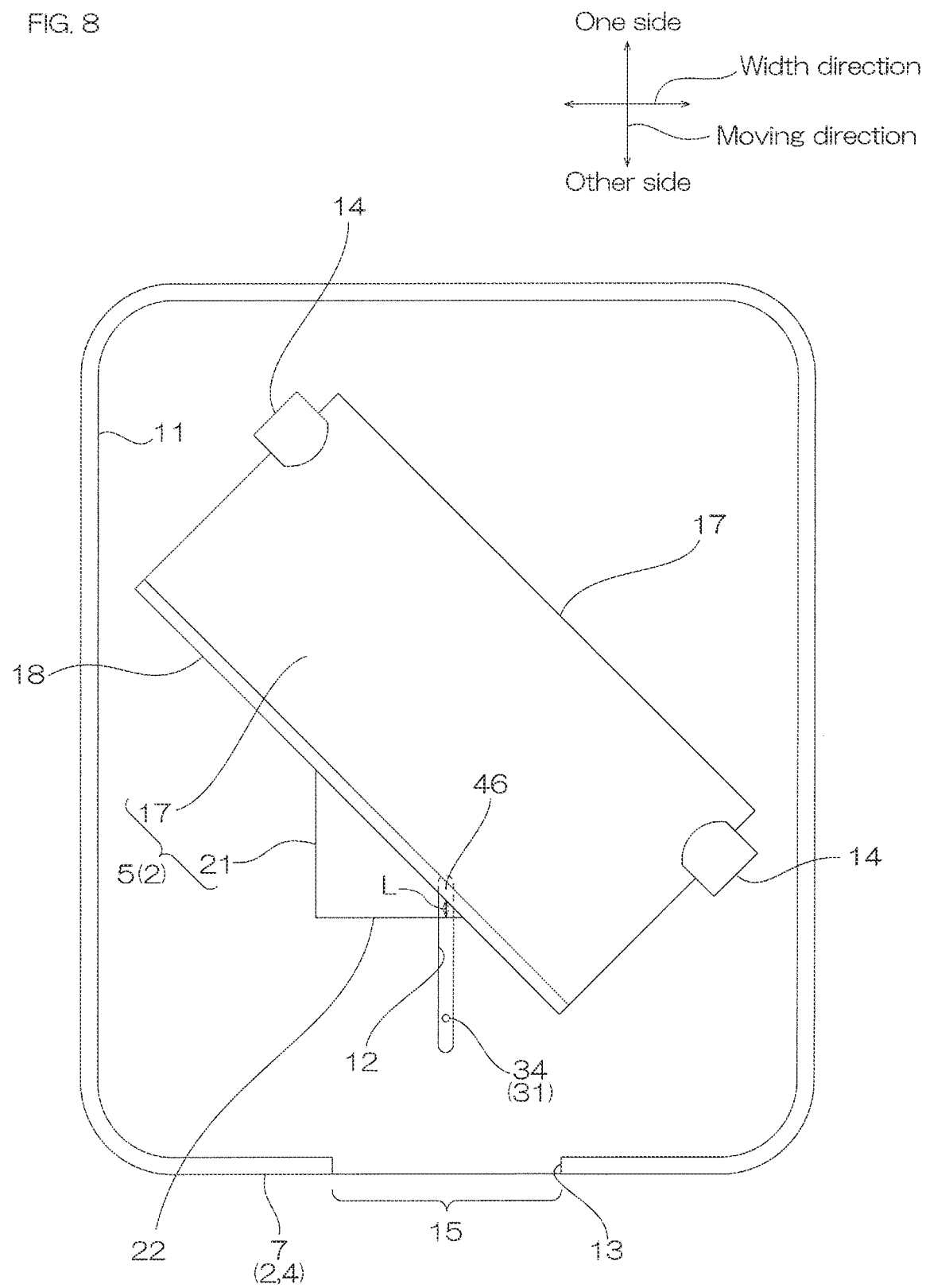
FIG. 8 shows an other side view of a closing plate, a front wall, and a blade portion of the cutting jig shown in FIG. 2.

Further, as shown in FIG. 8, a width directional intermediate portion 46 of the other end portion in the moving direction of the closing plate 21 is overlapped with one end portion in the moving direction of the slit 12 when projected in the front-rear direction. Thus, the width directional intermediate portion 46 of the other end portion in the moving direction of the closing plate 21 closes the front end edge of one end portion in the moving direction of the slit 12. The one end edge 22 in the width directional intermediate portion 46 of one end portion of the closing plate 21 is one example of an inclination imparting portion.

As shown in FIGS. 6A and 8, the one end edge 22 is located on the other side in the moving direction of the blade edge 18 when projected in the front-rear direction. In other words, the one end edge 22 and the blade edge 18 are disposed in order toward one side in the moving direction. Further, when projected in the front-rear direction, the one end edge 22 and the blade edge 18 are separated with an interval L therebetween. The interval L is appropriately set by a distance between a free end portion 34 and the one end edge 22 and/or the inclination as a target of the cut surface when cutting the free end portion 34. Specifically, the interval L between the one end edge 22 and a midpoint of the blade edge 18 is, for example, 0.1 mm or more, preferably 1 mm or more, and for example, 10 mm or less, preferably 5 mm or less.

The closing plate 21 is not disposed at the inside (space) of the slit 12. The front surface of the periphery of the slit 12 in the front wall 10 is in contact with the closing plate 21.

The closing plate 21 is fixed (adhered) (attached) to the front wall 10. Thus, the closing plate 21 is fixed to the case 4.

Then, both the blade portion 17 and the closing plate 21 are fixed to the case 4. That is, the blade portion 17 and the closing plate 21 are incapable of relative movement to each other. Thus, the inclination cutting unit 5 is fixed to the case 4.

A material for the closing plate 21 is not particularly limited, and the same material as that for the case 4 is used. Preferably, the material for the case 4 and the material for the closing plate 21 are the same.

As shown in FIG. 5, the fixing unit 3 is movable with respect to the holding cutting unit 2. The fixing unit 3 includes a fixing member 23 and a guiding member 24.

The fixing member 23 is a rear portion in the fixing unit 3. The fixing member 23 fixes the distal end portion 32 of the optical fiber 31. As shown in FIGS. 2 and 5, the fixing member 23 integrally includes a fixing plate 25 and a fixing cylindrical portion 27.

The fixing plate 25 has a generally flat plate shape which is thin in the front-rear direction. Further, the fixing plate 25 has a generally rectangular shape which is long in the moving direction. The fixing plate 25 is parallel to the rear wall 8. The fixing plate 25 has a through hole 26.

The through hole 26 penetrates the fixing plate 25 in the front-rear direction. The through hole 26 is disposed in one end portion in the moving direction in the fixing plate 25. The through hole 26 is, for example, a round hole. The through hole 26 has a size (inner diameter) capable of inserting a proximal end portion 33 of the distal end portion 32 of the optical fiber 31, and the distal end portion of the connector 35 (both are described later).

The fixing cylindrical portion 27 is disposed on the rear surface of the fixing plate 25. The fixing cylindrical portion 27 extends rearwardly from the rear surface of the fixing plate 25. The fixing cylindrical portion 27 surrounds the through hole 26. The fixing cylindrical portion 27 has a double cylindrical structure including an inner cylinder 41 and an outer cylinder 42. Preferably, the fixing cylindrical portion 27 includes only the inner cylinder 41 and the outer cylinder 42.

The inner cylinder 41 defines the through hole 26. The inner cylinder 41 has a generally cylindrical shape having the shaft thereof common with that of the through hole 26.

The outer cylinder 42 is disposed spaced apart from the outside of the inner cylinder 41. The outer cylinder 42 has, for example, a square cylindrical shape. The outer cylinder 42 extends longer than the inner cylinder 41 toward the rear side. Further, the outer cylinder 42 is also a holding portion which is held by the user when the fixing unit 3 is moved with respect to the holding cutting unit 2. Furthermore, the outer cylinder 42 has a first fitting portion 28 provided on its inner surface.

The guiding member 24 is disposed on the front side of the fixing member 23. The guiding member 24 has a thin plate shape in the front-rear direction. The guiding member 24 is parallel to the fixing plate 25. The guiding member 24 integrally includes a thick portion 30 and a thin portion 20.

The thick portion 30 is located in the other end portion in the moving direction of the guiding member 24. The rear surface of the thick portion 30 is fixed to the front surface of the fixing plate 25. The other end surface in the moving direction of the thick portion 30, and the other end surface in the moving direction of the fixing plate 25 are flush with each other to form one other end surface in the moving direction of the fixing unit 3.

The thin portion 20 is located on one side in the moving direction of the thick portion 30. The thin portion 20 is thinner than the thick portion 30. Specifically, the front surface of the thin portion 20 is flush with the front surface of the thick portion 30. The rear surface of the thin portion 20 is disposed spaced apart from the front side of the rear surface of the thick portion 30. Further, a guiding groove 16 is formed between the rear surface of the thin portion 20 and the front surface of the fixing plate 25. The guiding groove 16 is a receiving groove 16 which is capable of receiving the entry of the blade edge 18. The fixing plate 25, the thin portion 20, and the thick portion 30 form a generally U-shape in a side view having an opening toward one side in the moving direction by the guiding groove 16.

Further, the thin portion 20 has a guiding hole 29. The guiding hole 29 penetrates the thin portion 20 in the front-rear direction. The thin portion 20 is overlapped with the through hole 26 when viewed from the front. The guiding hole 29 is, for example, a round hole. The guiding hole 29 has a size (inner diameter) in which the free end portion 34 is movably inclined. Preferably, the guiding hole 29 has the same size as the through hole 26.

The fixing member 23 is movable with respect to the blade edge 18, while the fixing plate 25 and the thin portion 20 of the guiding member 24 sandwich the blade portion 17 in the front-rear direction therebetween. As long as the fixing cylindrical portion 27 moves inside the first hole 9, the fixing member 23 is movable with respect to the blade portion 17.

To obtain the cutting jig 1, as shown in FIG. 2, each of the rear case member 6, the front case member 7, the fixing member 23, the guiding member 24, the blade portion 17, and the closing plate 21 is prepared. Thereafter, for example, the thin portion 20 of the guiding member 24 is disposed with respect to the front wall 10 of the front case member 7, subsequently, the cut-out portion 19 of the blade portion 17 is locked to the locking portion 14 of the front case member 7 (ref: FIGS. 3 and 4), and the thick portion 30 of the guiding member 24 and the fixing plate 25 are bonded by an adhesive which is not shown. In this manner, the fixing unit 3 is produced.

Thereafter, the rear case member 6 is disposed with respect to the front case member 7 so that the fixing cylindrical portion 27 is inserted into the first hole 9. At this time, the rear wall 8 and the front wall 10 sandwich the fixing member 23, the blade portion 17, and the guiding member 24 therebetween. Further, the rear wall 8 of the rear case member 6 and the peripheral wall 11 of the front case member 7 are bonded (attached) by an adhesive which is not shown.

Thereafter, as shown in FIGS. 1 and 2, the closing plate 21 is disposed on the front wall 10. For example, the front wall 10 is bonded to the closing plate 21 by an adhesive which is not shown so that the one end edge 22 traverses one end portion in the moving direction of the slit 12. Thus, the holding cutting unit 2 is produced.

Thus, the cutting jig 1 including the holding cutting unit 2 and the fixing unit 3 is obtained.

<Cutting Method>

Next, a method for cutting the distal end portion 32 of the optical fiber 31 using the cutting jig 1 is described.

This method includes a preparation step of preparing each of the cutting jig 1 and the optical fiber 31 (ref: FIG. 5), a first step of fixing the proximal end portion 33 of the optical fiber 31 to the fixing member 23 (ref: FIG. 6A), a second step of inclining the free end portion 34 (ref: FIG. 6B), and a third step of cutting the free end portion 34 (ref: FIG. 6C) in order.

<Preparation Step>

As shown in FIG. 5, in the preparation step, for example, the fixing cylindrical portion 27 is held to be moved to the other end portion in the moving direction in the first hole 9. At this time, the fixing cylindrical portion 27 is slid toward the other side in the moving direction in the first hole 9. Specifically, the other end portion in the moving direction of the fixing cylindrical portion 27 is brought into contact with the first surface 51 of the rear wall 8. On the other hand, one end portion in the moving direction of the fixing cylindrical portion 27 is spaced apart from the second surface 52 of the rear wall 8.

When projected in the front-rear direction. the through hole 26 and the guiding hole 29 are overlapped with the other end portion in the moving direction of the slit 12, and are deviated from the closing plate 21. In the movement of the fixing cylindrical portion 27 described above, the through hole 26 and the guiding hole 29 move with respect to the holding cutting unit 2 so as to move away from the one end edge 22 and the blade edge 18 corresponding to the slit 12 (ref: FIG. 8).

As shown in FIG. 3, even after the movement of the fixing unit 3 described above, one end portions in the width direction of one end portions in the moving direction of the thin portion 20 and the fixing plate 25 sandwich the blade portion 17 therebetween in the front-rear direction. The other end portions in the width direction of one end portions in the moving direction of the thin portion 20 and the fixing plate 25 are deviated from the blade portion 17.

As shown in FIG. 5, the optical fiber 31 extends long along the transmission direction of the light. The optical fiber 31 has, for example, a generally circular shape in a cross-sectional view. Examples of a material for the optical fiber 31 include resins such as an acrylic resin and an epoxy resin, and transparent materials such as glass and ceramics. As the transparent material, preferably, from the viewpoint of ensuring excellent handling properties, a resin is used.

A connector 35 as one example of an anchor member is attached to the distal end portion 32 (one end portion in the transmission direction) of the optical fiber 31.

The connector 35 is a joint for connecting the distal end portion 32 of the optical fiber 31 to another optical member (not shown). The connector 35 has a generally cylindrical (specifically, circular cylindrical) shape. The connector 35 is anchored to the periphery of the proximal end portion 33 of the distal end portion 32, and is not anchored to the periphery of the free end portion 34 located on the front side (one side in the transmission direction) from the proximal end portion 33 in the distal end portion 32. The distal end portion 32 of the optical fiber 31 is defined into the proximal end portion 33 and the free end portion 34 described above depending on a presence or absence of the above-described anchor of the connector 35. The optical fiber 31, together with the connector 35, is prepared as an optical fiber connector 37. The optical fiber connector 37 includes the distal end portion 32 of the optical fiber 31, and the connector 35.

The distal end portion of the connector 35 has a double cylindrical structure including a connector inner tip cylinder 43, and a connector outer tip cylinder 44 which is disposed spaced apart in the radially outer side thereof.

The optical fiber connector 37 is, for example, prepared in accordance with the descriptions of Japanese Unexamined Patent Publications No. 2014-71174, 2013-257366, 2016-9041, 2013-68668, 2010-286795, 2010-511439, and 2011-75743.

A second fitting portion 36 which can be fitted into the first fitting portion 28 is provided on the outer peripheral surface of the connector 35. The second fitting portion 36 may be referred to as a latch. The second fitting portion 36 may be provided on one side in the moving direction of the connector 35.

<First Step>

As shown by an arrow of FIG. 5, and FIG. 6A, in the first step, the proximal end portion 33 is fixed to the fixing member 23. In the first step, specifically, first, the free end portion 34 of the optical fiber 31 passes through the through hole 26, the guiding hole 29, and the slit 12 in order from the rear side of the fixing unit 3 toward the front side.

At this time, the free end portion 34 traverses the guiding groove 16. The free end portion 34 traversing the guiding groove 16 passes through the slit 12, while the movement in all directions of a direction perpendicular to the transmission direction of the light in the optical fiber 31 (for example, a radial direction of the optical fiber 3) is restricted by the guiding hole 29.

The movement of the free end portion 34 in all directions of the direction perpendicular to the transmission direction of the light (for example, the radial direction) is restricted by the through hole 26 and the guiding hole 29. Therefore, the free end portion 34 traversing the guiding groove 16 is along the front-rear direction. In other words, the free end portion 34 is not yet substantially inclined in at least the moving direction.

A distal end edge 38 of the free end portion 34 is disposed at the front side with respect to the closing plate 21.

Then, the proximal end portion 33 is fixed to the fixing member 23. Specifically, as shown by the arrow of FIG. 5, the connector inner tip cylinder 43 is inserted into the inner cylinder 41, and the connector outer tip cylinder 44 of the connector 35 is inserted into the outer cylinder 42. In short, the connector inner tip cylinder 43 and the connector outer tip cylinder 44 are fitted into the inner cylinder 41 and the outer cylinder 42, respectively. Further, the second fitting portion 36 is fitted into the first fitting portion 28 of the fixing cylindrical portion 27.

Thus, the proximal end portion 33 is firmly fixed to the fixing member 23.

In the first step, the free end portion 34 is disposed spaced apart from the other side in the moving direction with respect to the blade edge 18 of the blade portion 17 and the one end edge 22 of the closing plate 21. A length between the free end portion 34 and the one end edge 22 is shorter than the length between the free end portion 34 and the blade edge 18.

<Second Step>

As shown in FIG. 6B, in the second step, the free end portion 34 is inclined.

The fixing unit 3 is moved with respect to the holding cutting unit 2 (first movement). The one end edge 22 of the closing plate 21 is brought into contact with the free end portion 34 of the optical fiber 31 based on the first movement.

Specifically, the fixing cylindrical portion 27 is moved from the other end portion in the moving direction thereof to the intermediate portion in the moving direction in the first hole 9.

Then, the free end portion 34 of the optical fiber 31 is brought into contact (contact with no load) with the one end edge 22 of the closing plate 21.

Subsequently, when the fixing cylindrical portion 27 is further moved (when the first movement is carried out), the free end portion 34 is moved so as to be inclined with respect to an extension line EL obtained by extending the proximal end portion 33 in the front-rear direction. More specifically, the distal end edge 38 of the free end portion 34 is moved toward the other side in the moving direction with respect to the extension line EL. That is, the free end portion 34 is inclined with respect to the extension line EL so as to be away from the extension line EL toward the distal end edge 38.

However, in the second step, the free end portion 34 is not yet in contact with the blade edge 18 and is spaced apart therefrom in the moving direction in the guiding groove 16.

An angle formed between the free end portion 34 and the extension line EL is, for example, 1 degree or more, preferably 5 degrees or more, and for example, 30 degrees or less, preferably 15 degrees or less.

Also, the free end portion 34 moves in the slit 12 during the first movement of the second step. Specifically, the free end portion 34 moves toward the other side in the moving direction in the slit 12, while the movement in the width direction is restricted.

<Third Step>

Subsequently, as shown in FIG. 6C, the inclined free end portion 34 is cut.

The fixing cylindrical portion 27 is further moved toward one side in the moving direction in the first hole 9 (second movement).

Then, the free end portion 34 in the guiding groove 16 is brought into contact with the blade edge 18, thereby being cut. Specifically, the free end portion 34 is first brought into contact with the blade edge 18, and the free end portion 34 traverses the blade edge 18 along the moving direction.

In the second movement of the third step, since the fixing unit 3 is moved with a larger movement amount than the first movement of the second step, a degree of inclination of the free end portion 34 when cut is large as compared with the inclination of the free end portion 34 before being cut.

In the second to the third steps described above, the blade edge 18 is immovable with respect to the one end edge 22, and specifically, the interval L between the one end edge 22 and the blade edge 18 (ref: FIGS. 6A and 8) is invariant during at least the first to the third steps.

Since the free end portion 34 is inclined with respect to the extension line EL, as shown by an enlarged view of FIG. 6C, by the transverse of the blade edge 18, a cut surface CL formed in the distal end portion 32 is inclined with respect to the direction perpendicular to the transmission direction of the light in the free end portion 34. An angle formed between the cut surface CL and the above-described perpendicular direction is, for example, 1 degree or more, preferably 5 degrees or more, and for example, 30 degrees or less, preferably 15 degrees or less.

Further, as shown in FIG. 6D, the blade edge 18 cuts the free end portion 34 by leaving the rear end edge 39 thereof.

The second and the third steps are carried out in a series of operations.

Thus, the free end portion 34 is separated from the proximal end portion 33 by leaving the rear end edge 39 thereof.

A length of the remaining rear end edge 39 is, for example, 0.01 mm or more, preferably 0.1 mm or more, and for example, 20 mm or less, preferably 5 mm or less.

Thereafter, as shown in FIG. 6D, by further moving the fixing unit 3 with respect to the holding cutting unit 2, the other end portions in the moving direction of the fixing member 23 and the guiding member 24 are housed (retracted) in the case 4. Thus, the other end surface in the moving direction of the fixing unit 3 is flush with the other end surface in the moving direction of the case 4.

Thereafter, by releasing the fitting of the first fitting portion 28 and the second fitting portion 36 to detach the optical fiber connector 37 from the fixing unit 3, the optical fiber 31 having the distal end portion 32 with the inclined surface formed is produced.

<Function and Effect of One Embodiment>

Then, the cutting jig 1 includes the one end edge 22 of the closing plate 21, and the blade portion 17 which are incapable of relative movement to each other. The distal end portion 32 of the optical fiber 31 is inserted into the fixing member 23 to be fixed, and the one end edge 22 is brought into contact with the free end portion 34 based on the first movement of the fixing member 23 with respect to the inclination cutting unit 5 to incline the free end portion 34. Following the first movement, the blade edge 18 is brought into contact with the free end portion 34 based on the second movement of the fixing member 23 with respect to the inclination cutting unit 5 to cut the free end portion 34 in an inclined state. Therefore, it is possible to form the cut surface CL along the direction inclining in the second direction of the free end portion 34 in the free end portion 34 of the optical fiber 31.

Further, since the cutting jig 1 includes the inclination cutting unit 5 including the one end edge 22 and the blade portion 17 which are incapable of relative movement to each other, the configuration is simple as compared with the device of Patent Document 1 including a pushing tool and a blade each of which moves independently.

Furthermore, since the fixing member 23 is moved with respect to the one end edge 22 and the blade portion 17 which are incapable of relative movement to each other, it is simple as compared with the device of Patent Document 1 including a pushing tool and a blade each of which moves independently.

Moreover, since the one end edge 22 and the blade portion 17 are incapable of relative movement to each other, it is possible to make an inclination state of the free end portion 34 uniform at the time of a contact of the blade edge 18 of the blade portion 17 with the free end portion 34. Therefore, it is possible to improve the formation accuracy of the cut surface CL of the optical fiber 31.

Further, in the cutting jig 1, the case 4 holds the blade portion 17 in the inclination cutting unit 5. Therefore, it is possible to reliably move the fixing member 23 with respect to the blade portion 17 by the case 4.

Furthermore, in the cutting jig 1, since the closing plate 21 is attached to the case 4, the configuration is simple.

Further, in the cutting jig 1, it is possible to smoothly incline and cut the free end portion 34, while the free end portion 34 is guided by the slit 12 in the first movement and the second movement.

Further, in the cutting jig 1, it is possible to easily configure one example of the inclination imparting portion by the one end edge 22 of the closing plate 21.

Further, in the cutting jig 1, since the blade edge 18 is inclined with respect to the width direction, it is possible to cut the optical fiber 31 with a small pressure as compared with a case of being along the width direction.

Further, in the cutting jig 1, since the connector 35 anchored to the periphery of the proximal end portion 33 is fitted into the fixing cylindrical portion 27 of the fixing member 23, it is possible to cut the free end portion 34, while the proximal end portion 33 is reliably fixed to the connector 35. Therefore, it is possible to furthermore ensure the formation accuracy of the cut surface CL of the cutting jig 1.

In the method for cutting the optical fiber 1, since the one end edge 22 and the blade portion 17 are moved together with respect to the inclination cutting unit 5, it is possible to easily carry out the inclination and the cutting of the free end portion 34. Therefore, it is possible to easily and accurately form the inclined cut surface CL.

MODIFIED EXAMPLES

In each modified example below, the same reference numerals are provided for members and steps corresponding to each of those in the above-described one embodiment, and their detailed description is omitted. Each modified example can achieve the same function and effect as that of one embodiment unless otherwise specified. Furthermore, one embodiment and each modified example thereof can be appropriately used in combination.

In one embodiment, the fixing unit 3 is moved with respect to the holding cutting unit 2. Alternatively, for example, though not shown, it is also possible to move the holding cutting unit 2 with respect to the fixing unit 3.

Further, the fixing unit 3 includes the guiding member 24. Alternatively, for example, though not shown, only the fixing member 23 can be also provided without including the guiding member 24.

As shown in FIGS. 9 to 10D, the inclination cutting unit 5 can also include a filling portion 61 which fills one end portion in the moving direction of the slit 12 instead of the closing plate 21.

As shown in FIGS. 9 to 10A, the filling portion 61 is one example of a filling member, and is disposed in one end portion in the moving direction of the inside of the slit 12. The one end edge 22 of the filling portion 61 is one example of an inclination imparting portion. The front surface of the filling portion 61 is, for example, flush with the front surface of the front wall 10. A material for the filling portion 61 is, for example, the same as the material for the case 4.

Also, by the cutting jig 1, in the second step, as shown in FIG. 10B, the one end edge 22 of the filling portion 61 is moved based on the contact with the free end portion 34 so as to incline the free end portion 34.

In the modified example, it is possible to easily configure the one end edge 22 which is an inclination imparting portion by the filling portion 61. Furthermore, since the filling portion 61 fills a portion of the slit 12, it is possible to reduce the size of the cutting jig 1.

As shown in FIGS. 11A to 11D, the inclination cutting unit 5 may be included in the front wall 10 without including the closing plate 21 or the filling portion 61, and an inner end edge 63 for defining one end in the moving direction of the slit 12 may be an inclination imparting portion.

The inner end edge 63 is located at the same position as the one end edge 22 in the filling portion 61.

In the modified example, since the case 4 does not need to include the closing plate 21 or the filling portion 61, it is possible to reduce the number of components. At the same time, it is possible to easily configure the inclination cutting unit 5 by the inner end edge 63 of the front wall 10.

In one embodiment, the free end portion 34 is cut to be separated from the proximal end portion 33 by leaving the rear end edge 39. Alternatively, for example, though not shown, it is also possible to cut the boundary between the free end portion 34 and the proximal end portion 33, and separate the entire free end portion 34 from the proximal end portion 33 without leaving the rear end edge 39.

Figure 12A:
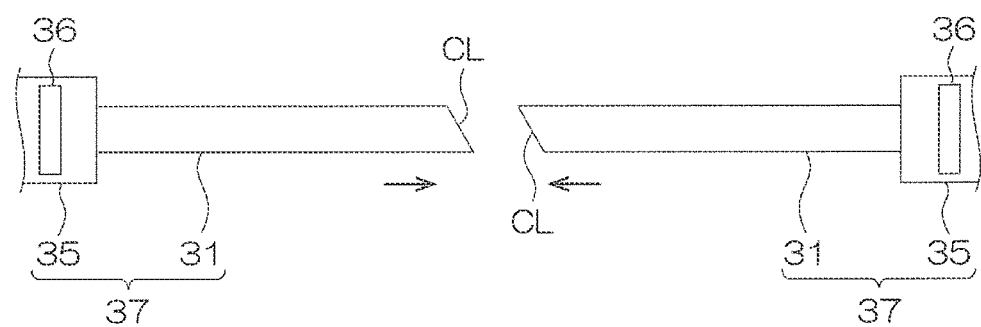
FIGS. 12A to 12B show process views for connecting two optical fibers.
Figure 12B:
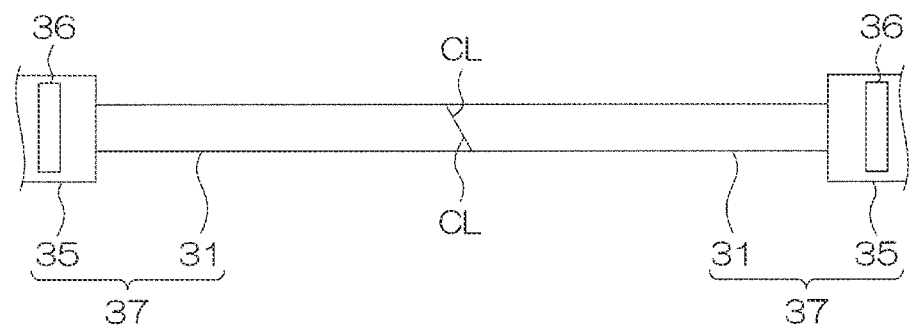

Next, a method for optically connecting the two optical fiber connectors 37 to each other is described with reference to FIGS. 12A to 12B. In FIGS. 12A to 12B, the connector 35 is simply drawn.

As shown in FIG. 12A, each of the two optical fibers 31, together with the connector 35, is provided in each of the two optical fiber connectors 37. A latch 36 disposed on the near side on the plane of the sheet is provided in the connector 35. In the optical fiber 31 in each of the two optical fiber connectors 37, in the cutting method of one embodiment, the optical fiber connector 37 is rotated at 90 degrees with the optical fiber 31 as a center, and thereafter, the free end portion 34 is cut. By the rotation of the optical fiber connector 37 described above, the latch 36 is disposed on one side in the moving direction. In this case, the first fitting portion 28 into which the latch 36 is fitted (ref: FIG. 5, however, not shown in FIG. 12) is located on one side in the moving direction of the inner surface of the outer cylinder 42. The latch 36 and the first fitting portion 28 face the same side.

Subsequently, the cut surfaces CL of the two optical fibers 31 face each other. As shown in FIG. 12A, the two cut surfaces CL are parallel to each other.

As shown in FIG. 12B, next, the cut surfaces CL of the two optical fibers 31 are brought into contact with each other. The entire cut surface CL of the optical fiber 31 of the one optical fiber connector 37 is in contact with the entire cut surface CL of the optical fiber 31 of the other optical fiber connector 37.

Thus, it is possible to improve a connection loss between the two optical fibers 31.

The above-described connection is, for example, applied in the case of extending the one optical fiber 31.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The cutting jig of the present invention is used for cutting an optical fiber.

DESCRIPTION OF REFERENCE NUMERALS

1 Cutting jig
4 Case
5 Inclination cutting unit
12 Slit
17 Blade portion
18 Blade edge
23 Fixing member
31 Optical fiber
32 Distal end portion
33 Proximal end portion
34 Free end portion
61 Filling portion
63 Inner end edge

The invention claimed is:

1. A cutting jig comprising:
   a fixing member having a through hole, wherein a distal end portion of an optical fiber is insertable into the through hole in a first direction, and wherein the fixing member is configured to fix the distal end portion in a state in which the distal end portion is inserted in the through hole,
   a wall disposed at one side of the fixing member in the first direction and being movable from a first position to a second position with respect to the fixing member in a second direction perpendicular to the first direction, and
   an inclination imparting portion and a blade portion, both of which are fixed on the wall,
   wherein when the wall is disposed at the first position with respect to the fixing member, the inclination imparting portion and the blade portion are disposed away from the through hole in the second direction,
   wherein when the wall is disposed at the second position with respect to the fixing member, the inclination imparting portion and the blade portion are overlapped with the through hole in the first direction,
   wherein the fixing member is configured to fix the distal end portion of the optical fiber such that:
      a proximal end portion is disposed at one side of the distal end portion and is fixed to the fixing member, and
      a free end portion is located at an other side of the distal end portion in the first direction as compared with the proximal end portion, the free end portion being not fixed to the fixing member;
   wherein the wall includes:
      a slit disposed in the wall and extending in the second direction, the slit configured to have the free end portion of the optical fiber inserted into the slit, the slit being overlapped with the through hole in the first direction in a state in which the wall is disposed at the first position with respect to the fixing member;
      wherein the inclination imparting portion is disposed at one side of the wall in the first direction or disposed in the slit; and
      wherein the blade portion is disposed at an other side of the wall in the first direction to cut the free end portion when the free end portion is brought into contact with the inclination imparting portion and inclined by the contact.

2. The cutting jig according to claim 1, further comprising a case having the wall, wherein
   the fixing member is movably attached to the case.

3. The cutting jig according to claim 1, wherein
   the fixing member has a cylindrical portion, and the cylindrical portion is configured to fittingly receive an anchor member that is attached to the proximal end portion of the optical fiber.

4. The cutting jig according to claim 1, wherein
   the slit is capable of guiding the free end portion during the movement of the wall with respect to the fixing member.

5. The cutting jig according to claim 1, wherein
   the inclination imparting portion is an end portion of a closing member, the closing member closing a portion of an open end edge of the slit.

6. The cutting jig according to claim 1, wherein
   the inclination imparting portion is an end portion of a filling member, the filling member filling a portion of the slit.

7. The cutting jig according to claim 1, wherein
   the inclination imparting portion is an inner end edge, the inner end edge extending in an extending direction of the slit in the wall.

8. The cutting jig according to claim 1, wherein
   a blade edge of the blade portion is inclined with respect to the slit.

* * * * *